J. FABER.
SPECTACLE TEMPLE OF SPIRAL WIRE.
APPLICATION FILED DEC. 4, 1914.

1,157,373.

Patented Oct. 19, 1915.

WITNESSES

INVENTOR
JULIUS FABER
BY
ATTORNEY

UNITED STATES PATENT OFFICE.

JULIUS FABER, OF STUTTGART, GERMANY.

SPECTACLE-TEMPLE OF SPIRAL WIRE.

1,157,373.  Specification of Letters Patent.  Patented Oct. 19, 1915.

Application filed December 4, 1914. Serial No. 875,444.

*To all whom it may concern:*

Be it known that I, JULIUS FABER, a citizen of the German Empire, residing at Stuttgart, in the Kingdom of Wurttemberg, Germany, have invented certain new and useful Improvements in Spectacle-Temples of Spiral Wire; and I do hereby declare the following to be a full, clear, and exact description of the invention, such as will enable others skilled in the art to which it appertains to make and use the same.

This invention relates to spectacle temples of spiral wire hollow along its whole length. Spectacle temples of the known type offer the inconvenient to cause a hurting pressure behind the ear of a sensible wearer. In order to obviate this drawback, it has been proposed to combine that part of the temple which is supposed to be fixed behind the ear with the other part being pivotally secured to the frame of the spectacle by means of an elastic spiral spring. This procedure has not been successful in practice because either the pressure behind the ear was not done away with or the spectacle did not fit comfortably. Furthermore there exist spectacle temples of spiral wire wound around a core of elastic wire. This construction especially is not suitable for the purpose of the invention, the core offering too great a pressure on account of the elasticity of the core.

According to the present invention all these inconveniences of the best known temples are done away with by the fact that the spectacle temple consists of a continuous spiral wire on its whole length. The temple is spun of several layers of finest damask metal threads in such manner that the temple is hollow on its whole length with the exception of the end where it is pivoted to the frame of the spectacle. At this end a short core engages into the hollow temple bar and serves to stiffen it at the connection end.

The lateral parts of the temple bar are somewhat thinner than the part engaging the ear of the bearer, thereby they are sufficiently elastic and smooth but strong enough to secure a correct and comfortable fit of the spectacle while the thicker ear part of the temple attains a smoothness of such degree that no pressure of the temple can be felt by the wearer behind the ear, the most sensible part of the head.

The present invention is illustrated on the accompanying one sheet of drawing.

Figure 1:
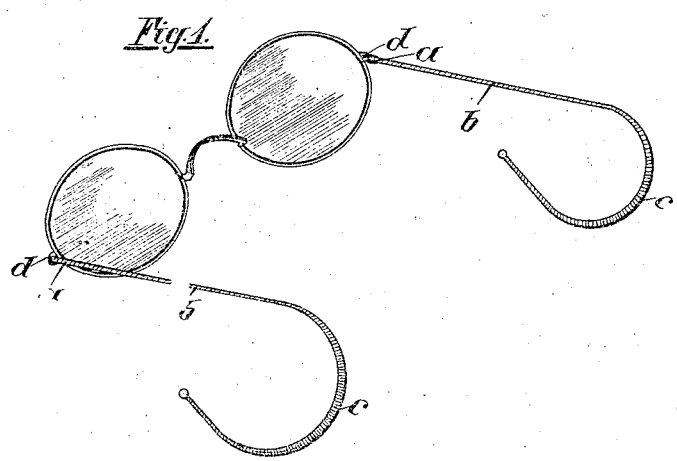
Figure 2:
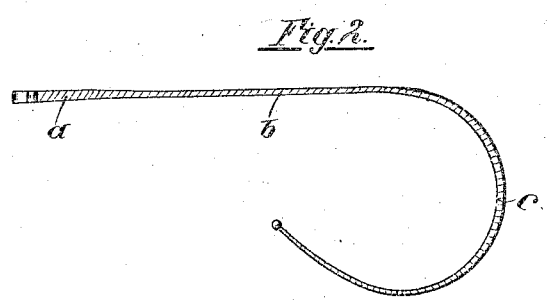
Figure 3:
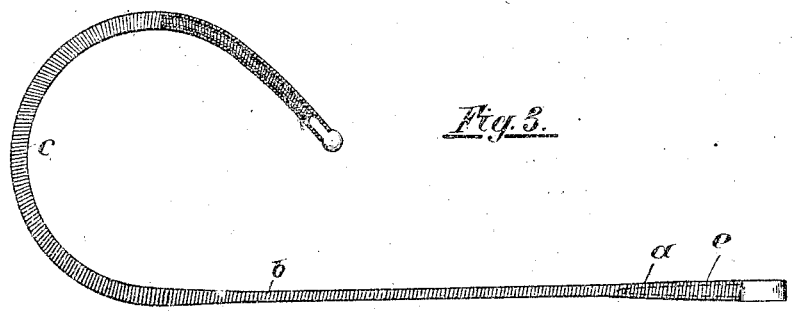

Figure 1 is a perspective view of the new temple attached to a spectacle, Fig. 2 is a side view of the temple itself on an enlarged scale, Fig. 3 is a side elevation, on a still larger scale, of the temple, a part being in section to show the inner coil.

The temple consists of several superposedly spun layers of fine hollow damask metal wire. In the drawing Fig. 3, there are illustrated two layers of wire coils. These coils are hollow from one end to the other. At the extremity $a$ which is linked to the point $d$ of the spectacle frame the hollow spring coil is stiffened by means of an inserted core $e$ its elasticity naturally thereby being removed. At some distance from the connection extremity $a$ the spiral becomes thinner at the part $b$ which is of the ordinary temple thickness. The free extremity $c$ of the temple which is to engage the ear of the wearer is of much increased diameter with respect to the part $b$, thereby a very high elasticity being attained and any pressure even the slightest one upon the ear being utterly impossible. The spiral spring is manufactured in such way that first, the damask wire is woven into the desired number of layers, the diameter being of the size of the part $c$. Hereafter the temple is tensioned to a thinner diameter in order to attain the thin diameter of the part $b$ while the stiffening core $e$ is soldered to the link $d$ of the spectacle. The windings after being completed are pressed so that the temple is quite smooth.

Having thus described my invention, I claim—

An elastic spectacle temple of spiral wire being hollow along its whole length and consisting of several layers of coils, these coils being smaller in diameter at the parts $b$ and larger at the parts $c$ engaging the ear, the soldering of the spiral to the frame and the stiffening of the hollow temple being rendered possible by means of a core $e$ inserted into the free open end of the temple.

In testimony whereof I affix my signature, in presence of two witnesses.

JULIUS FABER.

Witnesses:
 WALTER FERMARDETH,
 FERDA MAIHLE.